Patented Jan. 3, 1950

2,493,625

UNITED STATES PATENT OFFICE 2,493,625

PRODUCTION OF PENICILLIN

Moses Wolf Goldberg, Upper Montclair, and Sidney Teitel, Rutherford, N. J., assignors to Hoffmann-La Roche Inc., Nutley, N. J., a corporation of New Jersey No Drawing. Application February 26, 1947, Serial No. 731,058

11 Claims. (Cl. 260—302)

The present invention relates to a new method for the preparation of alkali and alkali earth metal salts of penicillin.

In penicillin manufacture, the extract obtained upon isolating the penicillin from the nutrient medium contains a complex mixture of different penicillins. Among the penicillins ordinarily found in the solvent extract there may be penicillin F, G, K and X. These penicillins have different therapeutic activities. At present, penicillin G is considered to be the most desirable type and therefore its recovery in a simple and economical manner is important. However, the other kinds of penicillin are also valuable antibiotics. Since free penicillin is an unstable preparation, it is desirable to obtain the penicillin in the form of its salts which are substantially stable, such as the sodium, potassium, and calcium salts of penicillin.

By penicillin, we mean each of the several antibiotic substances, for example, penicillin F, penicillin G, penicillin K and penicillin X or their mixtures, produced by the growth of a penicillin forming micro-organism, for example, *Penicillium notatum* or *Penicillium chrysogenum*, in a nutrient medium, and each of the same substances produced by any other means. The expressions "sodium penicillin," "potassium penicillin" and "calcium penicillin" are employed generically to cover the sodium, potassium and calcium salts of one or more of the kinds of penicillin. Crystalline sodium or potassium penicillin as employed herein is a heat-stable crystalline sodium or potassium salt of one or more of the kinds of penicillin mentioned. Crystalline sodium penicillin G is the stable crystalline sodium salt of penicillin G, crystalline potassium penicillin G is the stable potassium salt of penicillin G, calcium penicillin G is the calcium salt of penicillin G, and sodium penicillin K is the stable crystalline sodium salt of penicillin K.

According to our invention, we have found that alkali and alkali earth metal salts of penicillin can be directly prepared by reacting an organic amine salt of penicillin with an organo-alkali metal or organo-alkali earth metal compound, preferably in an organic medium. Our novel method thus has, among others, the important advantage of eliminating the cumbersome procedure heretofore employed in producing penicillin metal salts which involved treating the organic solvent extract of free penicillin with an aqueous solution of an inorganic alkali, such as sodium bicarbonate or calcium hydroxide, and subjecting the thus formed aqueous solution of the penicillin metal salt to vacuum drying from the frozen state.

By our novel method, alkali and alkali earth metal salts of penicillin can be readily produced in the form of mixtures of the various kinds of penicillin or in the form of the metal salts of one kind of penicillin, from penicillin salts of organic amines. In one embodiment of our invention, the organic amine salts of penicillin are suspended or dissolved in an organic medium, which is preferably anhydrous or substantially so, and are then treated with a solution or suspension of an organo-alkali metal or an organo-alkali earth metal compound in an organic medium, or by adding the organo-metal compound in dry form to the solution or suspension of the penicillin amine salt. We prefer to use as the organic medium a solvent in which the penicillin metal salt formed is less soluble than the amine salt employed. If solvents are employed in which the metal penicillin salts obtained are soluble, then a second solvent which has a low solubility for the salt may be added to precipitate the salt. Alternatively the salt may be obtained by concentrating the resulting solution of the penicillin salt. Any suitable temperature may be employed in practicing the process. The reaction proceeds effectively at room, lower than room, or elevated temperatures.

Organic amine salts in general of penicillin, as for example; primary, secondary and tertiary amine salts of penicillin, can thus be readily converted into the corresponding alkali and alkali earth metal salts of penicillin by our new and improved process. Examples of such amine salts are the triethylamine salt of penicillin K, the triethylamine salt of penicillin G, the N-ethyl-piperidine salt of penicillin G, the (1)-1-phenyl-1-hydroxy-2-methylamine propane salt of penicillin G, the (1)-, or the (d)-1-(3,4-dimethyl-phenyl)-2-amino-propane salts of penicillin or mixtures thereof, the cyclohexylamine salt of penicillin G, the dicyclohexylamine salt of penicillin G, the isopropylamine salt of penicillin G and the like. These can be readily converted, for example, into the corresponding crystalline sodium salts by treating suspensions or solutions of the amine salts in an anhydrous organic solvent, such as acetone, with an organo-sodium compound, such as diethyl sodio-malonate, in an organic solvent, such as n-butyl acetate. A reaction occurs with the formation of the corresponding penicillin sodium salt, which is obtainable in crystalline form.

The penicillin amine salts employed as intermediates can be readily prepared by adding an excess of the amine, as for example, triethylamine, N-ethylpiperidine, 1-(3,4-dimethyl-phenyl)-2-amino-propane, cyclohexylamine, dicyclohexylamine, (l)-1-phenyl-1-hydroxy-2-methyl-amino-propane, or isopropylamine, to an anhydrous n-butyl acetate solution of the penicillin in the form of the free acid. The corresponding amine salts crystallize directly or can be obtained in crystalline form by crystallization of the precipitate formed from a suitable solvent. In the case where pure penicillin G in the form of its free acid is thus treated with the above-mentioned amines, the corresponding crystalline amine salts of penicillin G are obtained.

In another embodiment of our invention, the reaction of the amine salt with the organo-metal compound can be part of a continuous process, in which a particular penicillin is first separated from its mixtures with other penicillins and/or impurities in the form of the above-mentioned amine salts, which are then directly converted into the corresponding metal salt. In other words, the step of forming crystalline amine salts of a particular penicillin can be combined with the step of converting these amine salts into the corresponding crystalline metal salts of the penicillin. In this manner, for example, crystalline sodium penicillin G, crystalline potassium penicillin G, and calcium penicillin G can be obtained in a highly purified form in a simple and economical manner.

In general, the combined process involves the following procedure:

To a concentrated and preferably purified and dried solution of free penicillin in an organic solvent, as obtained, for example, by extraction from penicillin broth using n-butyl acetate as solvent, is added an excess of an organic amine, such as any of the above-mentioned amines, for instance, triethylamine. A crystalline precipitate of the triethylamine salt of penicillin G results. The precipitate is next washed free of impurities with an organic solvent. We prefer to use a solvent in which the inactive impurities as well as the triethylamine salts of penicillins other than penicillin G are soluble, but in which the triethylamine salt of penicillin G is substantially insoluble or soluble to only a slight extent. A highly suitable solvent for this purpose has been found to be acetone, in which the triethylamine salt of penicillin G is only soluble to the extent of about one per cent or less. This solvent is also preferred for use in the conversion of the triethylamine salt to the sodium salt, thus permitting continuous processing without necessitating the drying of the triethylamine salt. The crystalline triethylamine salt of penicillin G thus obtained, while still wet with the acetone, is converted into the sodium or calcium salt of penicillin G by treating it with an organo-alkali or an organo-alkali earth metal compound as, for example, diethyl sodio-malonate or diethyl calcium-malonate. When employing the diethyl sodio-malonate with a solution of the triethylamine salt, or any other soluble amine salt of penicillin G in acetone, there is obtained directly the crystalline sodium salt of penicillin G. If the conversion is effected in a very concentrated suspension in acetone, the sodium salt obtained can be readily crystallized from an acetone-water solution, to yield substantially pure crystalline sodium penicillin G. When diethyl calcium-malonate is employed, the corresponding calcium salt of penicillin G is obtained.

It is to be understood that where no particular kind of penicillin is desired to be isolated, our new reaction can be carried out on the amine salts of mixtures of the various kinds of penicillins, in which case the final metal salt itself may be a mixture of such metal salts of the various penicillins.

The following examples will serve to illustrate the invention, but it is to be understood that the invention is not limited thereto.

*Example 1*

To one gram of the (d+l)-1-(3,4-dimethyl-phenyl)-2-amino-propane salt of penicillin G (M. P. 124–128° C.) dissolved at 40° C. in 200 ml. of acetone was added all at once, 1.0 ml. of a 2 N solution of diethyl sodio-malonate in n-butyl acetate. The solution on standing for five minutes at room temperature became turbid and began to deposit crystals. Crystallization was completed after storage at 4° C. for five hours, after which time the crystals were filtered off, washed twice with 25 ml. of acetone and freed of solvent at 50° C. under 50 mm. vacuum, yielding 0.7 gram of crystalline sodium penicillin G, assaying 1584 u./mg. against *Staphylococcus aureus*. This represents a 95 per cent yield.

The (d+l)-1-(3,4-dimethyl-phenyl)-2-amino-propane salt of penicillin G is obtained by adding to 19.2 ml. of n-butyl acetate solution containing penicillin G as the free acid (derived by acidifying 0.84 gram of sodium penicillin G with phosphoric acid) 22 ml. of an n-butyl acetate solution containing 0.5 gram of (d,l)-1-(3,4-dimethyl-phenyl)-2-amino-propane. The crystals formed were filtered off, washed first with n-butyl acetate, then with hexane, and were finally dried in vacuo.

*Example 2*

4.33 grams of crystalline cyclohexylamine salt of penicillin G (M. P. 128–138° C.) were suspended in 200 ml. of acetone. To the stirred suspension were added dropwise over a period of ½ hour, 4.7 ml. of a 2-N solution of diethyl sodio-malonate in n-butyl acetate. The suspension was stirred for another hour and then filtered. The residue was washed with two 50 ml. portions of acetone and the white sodium penicillin thus obtained was freed of solvent at 50° C. and 50 mm. vacuum. It weighed 3.21 grams, and had a *Staphylococcus aureus* value of 1556 u./mg. After one recrystallization from acetone-water, substantially pure crystalline sodium penicillin G was obtained, assaying 1640 u./mg. with a *Staphylococcus aureus/Bacillus subtilis* ratio of 0.98.

The cyclohexylamine salt of penicillin G was obtained by adding 1.38 grams of cyclohexlamine to 49 ml. of anhydrous n-butyl acetate solution containing 3.8 grams of penicillin G as the free acid. The crystals formed were filtered off, after the reaction mixture was permitted to stand for 24 hours at 4° C.

*Example 3*

To 3.95 grams of the crystalline isopropylamine salt of penicillin G (M. P. 124–126° C.) dissolved at 50° C. in 700 ml. of isopropanol were added 4.7 ml. of a 2 N solution of diethyl sodio-malonate in n-butyl acetate. The solution was concentrated to a 100 ml. volume at 30° C. under reduced pressure and set aside for 24 hours at 4° C. for crystallization. The crystals were filtered off, washed with two 20 ml. portions of isopropanol and freed of solvent at 50° C. under 15 mm. vacuum. The product thus obtained was pure white crystalline sodium penicillin G assaying 1625 u./mg. against *Staphylococcus aureus*.

The isopropylamine salt of penicillin G was obtained in the same manner as the cyclohexylamine salt of Example 2, except that isopropylamine was employed instead of cyclohexylamine.

Example 4

To 5.15 grams of crystalline dicyclohexylamine salt of penicillin G (M. P. 146–148° C.) suspended in 320 ml. of acetone at room temperature were added all at once, 5.28 ml. of a 1.78 N solution of diethyl sodio-malonate in n-butyl acetate. The suspension was stirred for one hour and then filtered. The residue was washed with three 20 ml. portions of acetone and then freed of solvent at 50° C. and 50 mm. vacuum. The white sodium penicillin thus obtained had a *Staphylococcus aureus* value of 1600. Upon crystallization from acetone-water, substantially pure crystalline sodium penicillin G was obtained, assaying 1680 u./mg. against *Staphylococcus aureus*.

The crystalline dicyclohexylamine salt of penicillin G was obtained in the following manner:

To a 100 ml. n-butyl acetate solution containing 7.8 grams of penicillin G as the free acid were added at room temperature 5.0 grams of dicyclohexylamine. The clear reaction mixture was stored at 4° C. for 15 hours. To the turbid reaction mixture was added 100 ml. of anhydrous ether. The reaction mixture was then kept at 4° C. for 15 hours. The precipitate was filtered off and recrystallized from acetonitrile. The crystals thus obtained had a M. P. of 146–148° C.

Example 5

To 500 mg. of the crystalline 1-ephedrine salt of penicillin G (M. P. 135–137° C. with decomposition) in 5 ml. of acetone at 35° C. were added 0.5 ml. of 1.78 N solution of diethyl sodio-malonate in n-butyl acetate. Crystals formed immediately. After storage of the reaction mixture at 4° C. for 1 hour, the supernatant liquid was centrifuged off. The crystals were washed with two 2 ml. portions of acetone and freed of solvent at 50° C. and 50 mm. vacuum. The crystalline sodium penicillin G thus obtained had a *Staphylococcus aureus* value of 1646 u./mg.

The 1-ephedrine salt of penicillin G was obtained by adding 8.3 grams of 1-ephedrine dissolved in 25 ml. of ether to 1.47 grams of penicillin G as the free acid dissolved in ether. The precipitated material was freed of solvent by decantation and crystallized from acetone-ether.

Example 6

To 4.35 grams of crystalline triethylamine salt of penicillin G dissolved in 435 ml. of acetone at 40° C. were added 6.0 ml. of a 1.5 N solution of ethyl sodio-acetoacetate in n-butyl acetate. Immediate crystallization took place. After storage of the reaction mixture at 4° C. for three hours, the crystals were filtered off, washed with two 50 ml. portions of acetone and freed of solvent at 50° C. and 50 mm. vacuum. The crystalline sodium penicillin G thus obtained had a *Staphylococcus aureus* value of 1600 u./mg.

Example 7

To 4.35 grams of crystalline triethylamine salt of penicillin G dissolved in 435 ml. of acetone at 40° C. were added 14.0 ml. of a 0.65 N solution of sodio-2-carbethoxy-cyclohexanone-1 in n-butyl acetate. Crystallization occurred immediately. The crystalline sodium penicillin G was recovered and had a *Staphylococcus aureus* value of 1652 u./mg.

Example 8

To 4.35 grams of crystalline triethylamine salt of penicillin G dissolved in 500 ml. of acetone at 50° C. was added 0.1 ml. of a 1.1 N solution of ethyl potassium-acetoacetate in n-butyl acetate. Immediate formation of crystals took place. The reaction mixture was stored at 4° C. for twelve hours, after which time the crystals were filtered off, washed twice with 20 ml. portions of acetone and finally freed of solvent at 50° C. under 50 mm. vacuum. There was thus obtained 2.31 grams of white crystalline potassium salt of penicillin G, assaying 1570 u./mg. against *Staphylococcus aureus* and 1590 u./mg. against *Bacillus subtilis*.

The following example will serve to illustrate our process in which the step of obtaining the pure amine salt of penicillin G is combined with the step of converting the amine salt into a metal salt of penicillin G.

Example 9

To 30 liters of a substantially anhydrous solution of penicillin in n-butyl acetate, obtained by extraction from penicillin broth using n-butyl acetate as a solvent, were added at room temperature 2.1 liters of triethylamine. The reaction mixture was stored at 4° C. for 48 hours, and then filtered. The residue, containing crystalline and amorphous material, was washed by slurrying with four 1 liter portions of acetone. There was thus obtained a white crystalline residue of substantially pure triethylamine salt of penicillin G. This salt, still wet with acetone, was then placed in a 5-liter 3-neck round bottom flask provided with a 500 ml. dropping funnel, stirrer and a calcium chloride drying tube. 3.7 liters of acetone were added, and to the stirred suspension were added at room temperature over a one-hour period, 374 ml. of a 2.0 N solution of diethyl sodio-malonate in n-butyl acetate. The suspension was stirred for an additional two hours and then filtered. The residue, slightly off-white in color, was first washed by slurrying with fresh portions of acetone until the filtrate had a pH of 7.5 and was then dissolved at room temperature in 1100 ml. of 90% aqueous acetone. The solution was then passed under 5 lbs. pressure through a 4 inch sterile Seitz filter into a sterile 2.5 gallon bottle containing 8.15 liters of sterile acetone. Crystallization began immediately. The bottle was stored at 14° C. for 18 hours, after which time its contents were filtered in a sterile hood onto an 8" sterile table top Buchner filter. The white crystals were washed with portions of sterile acetone (a total of 1 liter) and sucked free of excess acetone. The filter containing the crystals was then placed in a sterile desiccator containing phosphorous pentoxide, which was evacuated (1 mm. vacuum) until all volatile matter was removed. The dry, sterile, white crystalline sodium penicillin G thus obtained assayed 1665 units per mg. against both *Staphylococcus aureus* and *Bacillus subtilis*.

Example 10

To 2.0 grams of the crystalline triethylamine salt of penicillin K (M. P. 106–109° C.) dissolved in 35 ml. of acetone at 40° C. was added 2.0 ml. of a 2.0 N solution of diethyl sodio-malonate in n-butyl acetate. The solution was concentrated at a temperature of 35° C. to a volume of 5 ml. To this concentrate was added 50 ml. of ether, whereupon precipitation occurred. The precipitate was filtered off, washed with 10 ml. of ether and then dissolved at 35° C. in 25 ml. of acetone. Standing of this solution at 4° C. for about 15 hours gave a crystalline deposit. The white crystals of sodium penicillin K were filtered off, washed with 15 ml. of ether and freed of solvent at 1 mm. at 35° C. There was obtained 0.9 gram of sodium penicillin K, assaying 2000 units per mg. against *Staphylococcus aureus*, with a *Staphylococcus aureus/Bacillus subtilis* ratio of about 0.4.

Example 11

A sterile 1 liter 3-neck round bottom flask, fitted with a sterilizing candle, an inverted ¾" sintered-glass filter (reaching to the bottom of the flask) and a 10 cc. syringe was set up. Through the sterilizing candle was rapidly passed under pressure at 35° C. a solution of 4.69 grams of the crystalline (d+l)-1-phenyl-2-amino-propane salt of penicillin G (M. P. 114–118° C.) in acetone. Into the sterile flask contents was rapidly introduced via the syringe, 4.7 ml. of a 2 N sterile solution of diethyl sodio-malonate in n-butyl acetate. The faintly yellow solution began to deposit rosettes composed of colorless needles as it cooled to room temperature. Crystallization was aided by storage of the flask at 4° C. for 3 hours, after which time the mother liquor was sucked off through the inverted sintered-glass filter. The crystals were then washed with two 50 ml. portions of sterile acetone, the latter being introduced via the sterilizing candle. The crystals in the flask were then freed of solvent by placing the flask in a 50° C. constant temperature bath under 50 microns vacuum for 24 hours. The flask was then opened under a sterile hood and the crystals transferred to a sterile bottle. The crystalline sodium penicillin G thus obtained was sterile and assayed 1637 units per mg. against *Staphylococcus aureus*.

The (d+l)-1-phenyl-2-amino-propane salt of penicillin G was obtained by adding to 350 ml. of an anhydrous ether solution containing 6.9 g. of penicillin G as the free acid, 5.8 grams of (d,l)-1-phenyl-2-amino-propane dissolved in 350 ml. of anhydrous ether. An immediate precipitation occurred. The reaction mixture, after storage overnight at 4° C. was filtered. The precipitate was crystallized from acetone and found to have a M. P. of 114–118° C.

Example 12

To 2.0 grams of the crystalline triethylamine salt of penicillin G dissolved in 200 ml. of isopropanol at 40° C. was added, all at once, 1.5 ml. of a 1.9 N solution of diethyl calcium malonate in n-butyl acetate. Instant precipitation occurred. After standing for 1 hour at room temperature, the precipitate was freed of mother liquor by filtration, washed with two 20 ml. portions of isopropanol and finally dried at 50° C. in vacuo. White calcium penicillin G was thus obtained which assayed 1520 units per mg. against *Staphylococcus aureus*.

In a manner similar to that illustrated in the above examples, other amine salts of penicillin can be readily converted into the corresponding alkali metal and alkali earth metal salts. Among other penicillin amine salts which can be prepared and so converted are mentioned the following:

| Penicillin G salts of— | M. P., °C. |
|---|---|
| (d+l)-1-(3,4-dichloro-phenyl)-2-aminopropane | 124–128 |
| (d+l)-1-(2,3-dimethyl-phenyl)-2-aminopropane | 125–127 |
| (d+l)-1-(2,4-dichloro-phenyl)-2-aminopropane | 126–130 |
| (d+l)-1-(4-methyl-phenyl)-2-aminopropane | 126–129 |
| (d+l)-1-(5,6,7,8-tetrahydro-2-naphthyl)-2-aminopropane | 126–130 |
| (d+l)-ac-tetrahydro-β-naphthylamine | 106–111 |
| (d+l)-β-benzyl-isopropylamine | 117–120 |
| (d+l)-1-phenyl-5-aminohexane | 91–96 |
| (d+l)-2-amino-hendecane | 90–96 |
| (d+l)-2-amino-heptane | 112–116 |
| (d+l)-sec. butyl amine | 105–107 |

It is to be understood that all penicillin salts made from the d,l forms of amines containing an asymmetric carbon atom are mixtures of the corresponding diastereomeric salts. Accordingly, where we employ the designation (d+l), this is meant to designate that the penicillin salt formed from the racemic amine is a mixture of the two possible diastereomeric salts. These mixtures can be directly used for the conversion into metal salts or can first be separated into the optically pure compounds.

The above-mentioned penicillin amine salts can be readily prepared in the same manner as illustrated for the preparation of the penicillin amine salt set forth in Example 1, and in general according to the procedure set forth in the seventh paragraph of the specification.

Organo-alkali metal and organo-alkali earth metal compounds in general may be employed in the reaction. In addition to those already mentioned, other suitable compounds given by way of example are sodium n-butoxide, sodium isopropylate, potassium isopropoxide, diethyl potassium-malonate, diethyl magnesium-malonate, ethyl calcium-acetoacetate, sodium acetylacetone, calcium-acetylacetone, sodium phenolate, potassium-2-carbethoxy-cyclohexanone, potassium-2-carbethoxy-cyclopentanone-1, ethyl strontium-acetoacetate, ethyl lithium-acetoacetate, diethyl lithium-malonate, sodium-benzyloxide, potassium-benzyloxide, sodium-β-naphthoxide, sodium-guaiacolate.

In forming the amine salts of penicillin, as for example, of penicillin G, we have found it advantageous to employ the amine in excess over that theoretically required. As a solvent or suspending medium for the amine salt of penicillin G in the reaction with the organo-metal compound, we have found acetone to be highly suitable, although, if desired, isopropanol may also be employed for this purpose, as well as other solvents. The organo metal compound can be added in dry form to the solution or suspension of the amine salt of penicillin G, or it may be employed dissolved or suspended in an organic diluent, such as n-butyl acetate, ethyl acetate, diethyl malonate, cyclohexanone, cyclopentanone, diethyl ether, chloroform, carbon tetrachloride, isopropanol, butanol, cyclohexanol, ethyl acetoacetate, amyl acetate and the like, which is the preferred procedure.

Examples 9 and 11 illustrate procedures wherein our new process provides a simple and highly advantageous procedure for obtaining sterile alkali and alkali earth metal salts of penicillin. Subject matter disclosed herein but not claimed in this application is claimed in our copending application Ser. No. 737,107, filed March 25, 1947.

We claim:

1. A process of producing penicillin salts of alkali and alkaline earth metals which comprises reacting an organic amine salt of penicillin in an organic solvent with an organo metallo compound of the group consisting of alkali metal and alkaline earth metal dialkyl malonates, alkyl acetoacetates and acetyl acetone.

2. A process of producing penicillin salts of alkali metals which comprises reacting an organic amine salt of penicillin in an organic solvent with an alkali metal dialkyl malonate.

3. A process of producing penicillin salts of alkaline earth metals which comprises reacting an organic amine salt of penicillin in an organic solvent with an alkaline earth metal dialkyl malonate.

4. The process of producing crystalline sodium penicillin G, which comprises reacting an organic amine salt of penicillin G in a substantially anhydrous organic solvent with diethyl sodio-malonate.

5. The process of producing crystalline sodium penicillin G which comprises reacting the triethylamine salt of penicillin G in substantially anhydrous acetone with diethyl sodio-malonate.

6. The process of producing crystalline sodium penicillin G which comprises reacting the triethylamine salt of penicillin G in substantially anhydrous acetone, with diethyl sodio-malonate dissolved in n-butyl acetate.

7. The process of producing the calcium salt of penicillin G which comprises reacting the triethylamine salt of penicillin G in a substantially anhydrous organic solvent with diethyl calcium-malonate.

8. The process of producing alkali metal and alkali earth metal salts of penicillin which comprises reacting a free penicillin dissolved in an organic solvent with an amine to form the corresponding amine salt of penicillin and converting the latter to the corresponding metal penicillin salt in the presence of an organic medium by reacting the said amine salt with an organo metallo compound of the group consisting of alkali metal and alkaline earth metal dialkyl malonates, alkyl acetoacetates and acetyl acetone.

9. The process of producing substantially pure crystalline sodium penicillin G which comprises reacting free penicillin G dissolved in n-butyl acetate with triethylamine in excess, washing the crystalline precipitate thus obtained with acetone to remove impurities and to obtain substantially pure triethylamine salt of penicillin G, converting the latter into the corresponding sodium salt of penicillin G by reacting the triethylamine salt in an organic solvent with diethyl sodio-malonate, and crystallizing the sodium penicillin G formed from an organic solvent.

10. A process as in claim 9 wherein all but the last step are carried out under substantially anhydrous conditions.

11. A process for producing sodium penicillin G which comprises reacting an organic amine salt of penicillin G in an organic solvent with sodio-acetoacetic ester.

MOSES WOLF GOLDBERG.
SIDNEY TEITEL.

REFERENCES CITED

The following references are of record in the file of this patent:

Pfizer, Jan. 22, 1944, pp. 24–26.
Heyden, Discovery Report H-II, 2 pages, May 22, 1944.
Heyden, IV, 2 pages, June 15, 1944.

Certificate of Correction

Patent No. 2,493,625 January 3, 1950

MOSES WOLF GOLDBERG ET AL.

It is hereby certified that error appears in the printed specification of the above numbered patent requiring correction as follows:

Column 7, line 47, for "6.9 g." read *6.7 g.*;

and that the said Letters Patent should be read with this correction therein that the same may conform to the record of the case in the Patent Office.

Signed and sealed this 25th day of April, A. D. 1950.

[SEAL]

THOMAS F. MURPHY,
*Assistant Commissioner of Patents.*